Nov. 28, 1967   O. G. MUELLER   3,355,143
PLASTIC VALVES
Filed Oct. 19, 1965
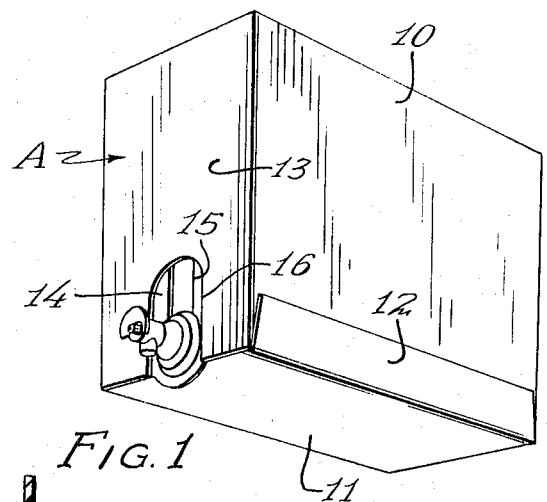
FIG. 1
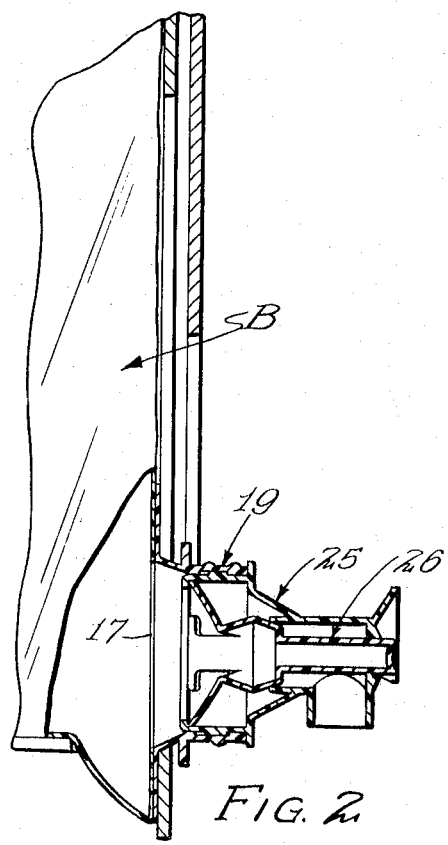
FIG. 2
FIG. 3
FIG. 5
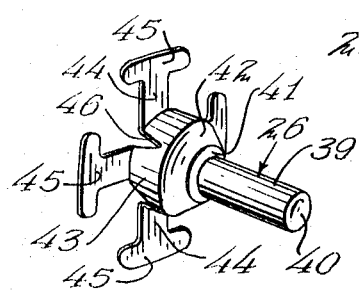
FIG. 4
INVENTOR
OSCAR G. MUELLER
BY
ATTORNEY

United States Patent Office 3,355,143
Patented Nov. 28, 1967

3,355,143
PLASTIC VALVES
Oscar G. Mueller, Grand Island, Nebr., assignor to Waldorf Paper Products Company, St. Paul, Minn., a corporation of Minnesota
Filed Oct. 19, 1965, Ser. No. 497,816
10 Claims. (Cl. 251—321)

ABSTRACT OF THE DISCLOSURE

This invention relates to a simple plastic valve made of two main parts assembled by inserting one part into the other. The valve body includes a large diameter end, a frusto-conical connecting portion, and a relatively small diameter sleeve having an outlet passage therein. A frusto-conical valve member is held against the inner end of the sleeve by angularly spaced resilient arms. A valve stem extends through the sleeve to provide a means of opening the valve.

---

This invention relates to an improvement in plastic valves and deals particularly with a simple two-part valve which may be assembled at extremely low cost.

The use of plastic bags supported by paperboard containers for use in containing and dispensing liquids has greatly increased. For example, milk is often contained in bags of this type, the bags usually containing five gallons of milk and being provided with integral plastic hoses through which the milk is dispensed. When the milk is to be used, the container is open to the extent necessary to gain access to the tube, the bag and container are placed in a cooling cabinet, and the dispensing tube is pinched closed by means of a suitable manually operable clamp.

While containers of this type are very practical for use in restaurants and other places where considerable quantities of milk are used and where the purchase of a suitable cooling cabinet is practical, they are not particularly suitable for home use. While tube clamps may be used to control the flow of milk from the containers, it is normally necessary to open the refrigerator door, place a glass or other receptacle beneath the tube with one hand and to operate the clamp with the other. While this can be readily done by adults, it is considerably more difficult for small children and the milk which is spilled will drop on the refrigerator or on the floor. Accordingly, many adults prefer their children to pour the milk from bottles, as the receptacle may be placed in the sink or on the drainboard where the spilled milk may drain away.

Much of the objection to the use of plastic bags for containing milk could be avoided by providing the container with a valve which could be easily operated by small children as well as by adults. However, this would require either the transferring of a permanent valve from one container to another, or else discarding the valve with the container. In the past, most valves have been considered too expensive to be disposable. The present invention relates to a valve which may be produced at a sufficiently low price and assembled at a sufficiently low cost to permit the disposing of the valve with the container.

It is an object of the present invention to provide a thermoplastic valve which may be molded at a sufficient rate of speed and at a sufficiently low cost that the valve may be discarded with the container after a product such as milk has been dispensed. In other words, when used in conjunction with a container capable of holding three to five gallons of milk, the cost of the valve does not materially add to the total cost of the product. In order to accomplish this object, several conditions must be met, some of which are as follows:

The body of the valve must be of substantially equal thickness throughout in order to provide a low molding cycle time.

The valve must be made of no more than two parts which may be assembled by merely snapping the parts together.

The valve must be operated easily enough to permit the operation by a small child.

The valve must be self-closing when activating pressure is released.

The valve must be such that a relatively small surface area is wetted in use and then exposed to air and contamination at the outer end of the valve.

A positive spring action must be provided holding the valve closed, the spring being a part of the molded structure.

The flow through the valve must be sufficient to permit the filling of a glass or other receptacle in a short period of time.

A feature of the present invention resides in the provision of a valve which meets all of the requirements listed above. The valve includes a molded plastic body including an outlet passage and a valve seat, and a valve element having at its inner end a series of radially extending, angularly spaced spring arms. The two parts, when assembled, merely snap into place so that the valve is urged against its seat by the spring pressure of the resilient arms. The valve element includes a stem extending axially through the body to project therefrom. By pressing upon the end of the valve stem, the valve may be separated from its seat so that the liquid may flow through the valve body.

A feature of the present invention resides in the provision of a valve of the type described having a flange projecting outwardly from the end of the valve body. By placing two fingers on opposite sides of the valve body, and in engagement with the flange, the valve stem may be depressed with the thumb.

A further feature of the present invention resides in the provision of a valve having a valve body provided with a hollow cylindrical sleeve at its inner end, a relatively small diameter sleeve extending forwardly from the first sleeve, and a right angular discharge passage communicating with the small diameter sleeve. The outer end of the small diameter sleeve is apertured to accommodate the stem of the valve element. An inwardly directed flange is provided at the inner end of the large diameter sleeve. This flange forms a shoulder against which the spring arms of the valve element may engage. The valve element includes a frusto-conical portion which is urged against the inner end of the small diameter sleeve by the integral spring arms. The valve stem is of materially smaller diameter than the small diameter sleeve so that when the valve is open, the fluid can flow about the valve stem to the discharge spout.

These and other objects and novel features of the present invention will be more clearly and fully set forth in the following specification and claims.

In the drawings forming a part of the specification,

FIGURE 1 is a perspective view of the liquid container with the dispensing valve projecting therefrom.

FIGURE 2 is a vertical sectional view through the valve and through a portion of the container.

FIGURE 3 is a perspective view of the valve element.

FIGURE 4 is a perspective view of the valve body.

FIGURE 5 is an enlarged sectional view through the valve and the bag opening.

Due to the fact that the specific form of the outer container and the inner bag are not if importance to the present invention, this structure is not shown in detail. However, in actual practice, the outer container A usually comprises a rectangular container made of corrugated paperboard having tubularly arranged side walls such as 10 and top and bottom walls such as 11 connected in tubular relation by means of a stitch flap 12. The vertical ends of the container are provided with end flaps such as 13 and inner flaps, one of which is indicated at 14. The inner flap 14 is provided with a key hole-shaped slot 15, the upper end of which is of great enough diameter to permit the valve to be inserted therethrough. The lower portion of the slot is narrower and is adapted to engage the bag discharge member in a manner to hold the valve from axial movement relative to the container. The outer flap is provided with a generally U-shaped area defined by a perforated line and which is in registry with the slot 15. FIGURE 1 of the drawings shows the U-shaped opening 16 which is formed after the removable area has been removed.

The inner receptacle B comprises a plastic bag having a circular opening 17 in a wall thereof, the opening being indicated in FIGURE 2 of the drawings. The aperture 17 communicates with a discharge sleeve which is indicated in general by the numeral 19. The sleeve 19 has a generally cylindrical outer end 20, a frustoconical connecting portion 21 and a large diameter peripheral flange 22 connected to the larger diameter end of the connecting portion 21. The flange 22 is heat sealed to the portion of the bag B encircling the aperture 17. The discharge sleeve 19 also includes a peripheral flange 23 spaced from the flange 22 and of considerably smaller diameter. The cylindrical portion of the sleeve is provided at its outer extremity with an inwardly extending flange 24, the edge of which serves as an abutment to prevent the valve, which will be described, from becoming disengaged from the sleeve 19.

The flange 23 is sufficiently small in diameter to fit through the enlarged upper portion of the slot 15. As a result, during shipment, the valve and bag discharge are contained entirely within the outer container A. When the contents are to be dispensed, the removable area of the outer container A is removed, the valve grasped by reaching through the slot 15, and the valve drawn through the wide upper portion of the slot 15. When the discharge sleeve is fully withdrawn, the flange 22 thereof engages the rear surface of the flap 14 and the flange 23 is outwardly of the flap 14. The sleeve is then slid downwardly in slot 15, the flap 14 being engaged between the flanges 22 and 23 to hold the sleeve in proper place.

The valve is formed as best illustrated in FIGURE 5 of the drawings. The valve includes a body portion which is indicated in general by the numeral 25 and a valve element which is indicated in general by the numeral 26. The valve body 25 includes a cylindrical sleeve 27 having at its inner end an inwardly directed flange 29. The forward or outer end of the sleeve 27 is provided with an outwardly directed flange 30 which engages against the outer end of the cylindrical portion 20 of the bag discharge sleeve 19 when the valve is in place. The sleeve 27 also includes a ring-shaped flange 31 on its outer surface spaced from the flange 30 and engageable with the inwardly extending flange 24 of the sleeve 19.

The valve body 25 includes a frusto-conical connecting portion 32 connected at its large diameter end to the forward end of the sleeve 27. The small diameter end of the connecting portion 32 is connected to a relatively small diameter sleeve 33, the inner end of which continues beyond its point of connection with the connecting portion 32 to provide a hollow cylindrical valve seat 34. The outer end of the sleeve 33 includes an end closure disc 35 having an axial aperture 36 extending therethrough. The diameter of the aperture 36 is small relative to the inner diameter of the sleeve 33 so that fluid may freely flow through the sleeve 33 when the valve element is in place.

A right angularly extending discharge spout 37 which may be of slightly smaller diameter than the sleeve 33 communicates with the interior of the sleeve 33. In effect, the sleeve 33 and spout 37 form an elbow through which the fluid may flow.

The valve element 26 includes an elongated tubular valve stem 39 having a closed outer end 40, the diameter of the stem 39 snugly fitting through the axial aperture 36 in the end closure 35. A peripheral flange 41 is provided at the inner end of the stem 39, the periphery of which is connected to a frusto-conical wall 42 which is designed to engage against the valve seat 34 in closed position of the valve. The large diameter end of the frusto-conical portion 42 is connected to the large diameter end of a second frusto-conical portion 43. A series of angularly spaced arms 44 are connected to the small diameter end of the tapered portion 43 and extend outwardly and rearwardly therefrom. The outer ends of the arms 44 are provided with transversely elongated locking portions 45. Notches 46 are provided in the frusto-conical portion between the arms 44 to increase the resiliency of the arms.

The valve is assembled by merely inserting the stem 39 of the valve element 26 through the sleeve 27 and sleeve 33 and then through the aperture 36 in the end closure 35 of the sleeve 33. The arms 44 are then flexed until the locking members 45 snap over the flange 29 on the sleeve 27. When in this position, the arms 44 are slightly bowed and are under spring tension urging the frusto-conical portion 42 of the valve element against the valve seat 34. The valve is then in readiness for use.

In order to facilitate the opening of the valve, a frusto-conical flange 49 is provided connected at its small diameter end to the forward end of the sleeve 33. The concave surface of the flange 49 encircles the projecting end of the valve stem 39 so that the stem is protected from accidental depression during shipment. The flange 49 extends somewhat more than half the circumference of the sleeve 33, the lower portion of the sleeve end remaining unflanged so that the operator may better see the discharge spout 37. By placing two fingers rearwardly of the flange 49 and pressing upon the end of the valve stem 39 with the thumb, the arms 44 may be flexed to permit the liquid to flow through the sleeve 33 and from the discharge spout 37.

Due to the inexpensive nature of the valve, it may be used on a container of milk holding two and one-half to three gallons of milk without adding materially to the cost of the product. After all of the milk has been dispensed, the entire container may be discarded and replaced.

In accordance with the patent statutes, I have described the principles of construction and operation of my improvement in plastic valves; while I have endeavored to set forth the best embodiment thereof, I desire to have it understood that obvious changes may be made within the scope of the following claims without departing from the spirit of my invention.

I claim:
1. A valve comprising:
 a plastic body including
 a substantially cylindrical end portion,
 a frusto-conical connecting portion having its large diameter end connected to said cylindrical end portion,
 a relatively smaller diameter sleeve connected to the small diameter end of said connecting portion,
 said sleeve having a discharge passage therein,
 a plastic valve element comprising a substantially frusto-conical valve portion engageable with the end of said sleeve, a valve stem projecting axially from the small diameter end of said valve portion, and a plurality of resilient angularly spaced arms extending outwardly and rearwardly from the other end thereof,
 means on said cylindrical end portion of said valve engaging said resilient arms to urge said valve portion against the end of said sleeve, said valve stem projecting from said sleeve to permit actuation of said valve element.

2. The structure of claim 1 and in which said plastic body and valve element have substantially equal wall thickness throughout.

3. The structure of claim 1 and in which said discharge passage comprises a substantially cylindrical spout on, and angularly related to, said sleeve.

4. The structure of claim 1 and in which said sleeve includes an outer end closure through which said valve stem extends.

5. The structure of claim 1 and in which said means on said cylindrical end portion comprises an inwardly extending flange.

6. A valve comprising:
a plastic valve body including
a substantially cylindrical end portion,
an inwardly extending flange at one end of said end portion,
a relatively smaller diameter sleeve connected to said flange and substantially coaxial with said end portion and forming a continuation thereof,
said sleeve having a discharge passage therein,
a valve element including a tapered portion engageable against the inner end of said small diameter sleeve, a valve stem extending through said sleeve and terminating beyond the end of said sleeve, and integral resilient means urging said tapered portion,
said integral resilient means comprising a plurality of angularly spaced arms extending outwardly and rearwardly from the axis of said valve element, and shoulder means on the inner surface of said end portion of said valve body engaging said arms and holding them under tension to urge said tapered portion against the end of said sleeve.

7. The structure of claim 6 and including flange means on said sleeve near the outer end thereof against which the fingers may engage when said valve stem is engaged by the thumb of a hand.

8. The structure of claim 7 and in which said flange means extends forwardly and outwardly from said sleeve to protect the end of said valve stem.

9. The structure of claim 6 and in which said sleeve includes an end closure at its outer end through which said valve stem extends.

10. The structure of claim 6 and in which said valve element is made of resilient plastic and has a substantially uniform wall thickness throughout.

References Cited

UNITED STATES PATENTS

| 66,579 | 7/1867 | Fuller | 251—320 |
| 2,103,822 | 12/1937 | Perry. | |
| 2,159,490 | 5/1939 | Ramsey | 251—321 X |
| 2,661,019 | 12/1953 | Snyder et al. | 251—368 X |
| 2,681,752 | 6/1954 | Jarrett et al. | 251—320 X |

FOREIGN PATENTS 567,544  10/1957  Italy.

M. CARY NELSON, *Primary Examiner.*

ARNOLD ROSENTHAL, *Examiner.*